United States Patent [19]

Roubinek

[11] 4,134,861

[45] Jan. 16, 1979

[54] NITRATE SELECTIVE AMIDINE ION EXCHANGE RESINS

[75] Inventor: Lubor Roubinek, London, England

[73] Assignee: Diamond Shamrock (Polymers) Limited, England

[21] Appl. No.: 812,415

[22] Filed: Jul. 1, 1977

[30] Foreign Application Priority Data

Jul. 3, 1976 [GB] United Kingdom ............... 27781/76

[51] Int. Cl.² ............................ C08F 8/32; C02B 1/56
[52] U.S. Cl. .................................. 521/32; 210/37 R; 526/16; 526/23; 526/49
[58] Field of Search ............................. 526/16, 23, 49; 260/2.1 E; 210/37 R

[56] References Cited

U.S. PATENT DOCUMENTS

| | | | |
|---|---|---|---|
| 3,389,096 | 6/1968 | Abrams et al. | 260/2.1 E |
| 3,826,787 | 7/1974 | Capozza | 526/23 |

*Primary Examiner*—Stanford M. Levin
*Attorney, Agent, or Firm*—William A. Skinner

[57] ABSTRACT

Water swellable ion exchange resins comprising a polymeric matrix and amidine groups are described together with their synthesis. The preferred amidine groups are nitrate selective and methods of selectively removing nitrate from water are also described.

16 Claims, No Drawings

NITRATE SELECTIVE AMIDINE ION EXCHANGE RESINS

It is generally known that ions (cations and anions) are not all exchanged by ion-exchange resins at the same rate i.e. some ions, in mixture with other ions, are taken preferentially.

An ion exchange resin is thus called a specific or selective resin for any ion that it takes preferentially. The selectivity of a resin for a certain ion can be expressed numerically or better graphically. It is always expressed as the selectivity of one ion over another, e.g. $NO_3^-/Cl^-$, $Ca^{++}/Na^+$ etc. A nitrate selective resin is not known, though some commercial anion-exchange resins are moderately selective for nitrate ion.

The removal of nitrate ion from potable water is becoming an urgent problem because its level increases steadily due to the use of nitrogen fertilisers and to pollution. Nitrates are harmless for adults, but they are dangerous for infants as they are reduced in their digestion tract into poisonous nitrites.

It has been proposed in an article by Grinstead and Jones in "Nitrate Removal from Waste Waters by Ion Exchange" published by Dow Chemical Company, 1971 to selectively remove nitrate from water by contacting the water with a macroporous styrene divinyl benzene resin onto which has been physically adsorbed a liquid amidine such as N-dodecyl $N^1$(2-ethylhexyl)2-ethylhexylamidine. Such a liquid is water immiscible.

It is now found that nitrate ion can be selectively removed from water containing it by contacting the water with a novel water swellable, ion exchange resin. This novel resin comprises a polymeric matrix with amidine groups chemically bonded to the matrix and which have the formula

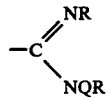

where the radicals R and Q represent hydrogen, aliphatic or aromatic groups or together form an aliphatic chain and which in total provide up to 12 carbon atoms, i.e. 0 to 12 or more usually 1 to 12 carbon atoms.

Ion exchange resins of this class are of general utility for ion exchange. They all have the advantage that they are best made by methods such as those described below and which avoid the need for a chloromethylation reaction. The resins of the invention are water swellable solids, thereby permitting optimum contact between the water to be purified and the ion exchange groups. The precise degree of water swellability can be controlled by appropriate choice of the substituents R and Q and the particular polymeric matrix. It is found that the water swellability of the resins tends to increase with a decrease in the number of carbon atoms in the groups R and Q and so these groups preferably in total have 9 or less carbon atoms. Preferably the degree of water swellability is broadly similar to the swellability of conventional ion exchange resins.

The amidine group can be present in free base form or in the form of a salt, usually the hydrochloride salt, and this results in the resin being more water swellable than it would otherwise be.

The radicals R and Q may be the same or different and may represent diverse radicals such as hydrogen, alkyl, and aralkyl. An aralkyl group is benzyl. The alkyl groups may contain, for instance, up to 8 carbon atoms or more. Preferably both radicals are $C_{1-6}$ alkyl or one is benzyl and the other is alkyl, usually methyl or, preferably, ethyl. The radical Q may be selected from the same groups but is normally $C_{1-4}$ alkyl or preferably is hydrogen. The two radicals R may together with the two nitrogen atoms and the carbon to which they are attached form a ring, preferably of 5 or 6 members, the radicals R preferably forming a methylene chain of 2 or 3 members.

It is found that the total number of carbon atoms provided by the substituents R and Q affects the nitrate selectivity and the ease of regeneration of the resins, with the higher numbers of carbon atoms tending to provide greater nitrate selectivity but less easy regeneration. The best balance between nitrate selectivity and ease of regeneration is obtained when the total number of carbon atoms in the groups R and Q is 4 or 5 to 9, preferably 5 to 7, carbon atoms, with best results being obtained generally with 6 carbon atoms. Thus Q is preferably hydrogen and the substituents R are preferably benzyl and ethyl, butyl and ethyl, dipropyl, or propyl and ethyl, with butyl and ethyl generally being preferred. Butyl and propyl groups may be straight or branched chain. Thus n-butyl, n-propyl and iso-propyl may be used, and the dipropyl substitution may be n-propyl and iso-propyl.

For ion exchange processes where nitrate selectivity is not required the groups R and Q may satisfactorily provide lower numbers of carbon atoms, and two or all may be hydrogen.

The matrix is preferably a vinyl polymeric matrix preferably cross-linked by divinyl benzene. For instance the ion exchange resin may comprise the recurring unit

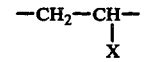

where X is the amidine group. The amount of divinyl benzene or other cross-linking agents used may advantageously be quite small, for instance 0.5% e.g. 0.5 to 2% or 2.5%, especially when the amidine group is substituted by longer paraffinic chains, to high values, for instance up to 10%, when the substituents are short alkyl groups such as methyl, ethyl or propyl, and/or when a macroporous resin structure is being used as the matrix.

The matrix is normally in the form of small beads, e.g. 300-1000$\mu$ in diameter.

The ion exchange resins of the invention are best prepared by introducing the desired amidine groups into a preformed polymer having the desired amount of cross-linking. For instance the polymer may be made by converting acrylate groups in cross-linked polymethyl or polyethyl acrylate to amidine groups or by converting nitrile groups in cross-linked polyacrylonitrile into amidine groups.

Three different methods of preparing the resins are as follows.

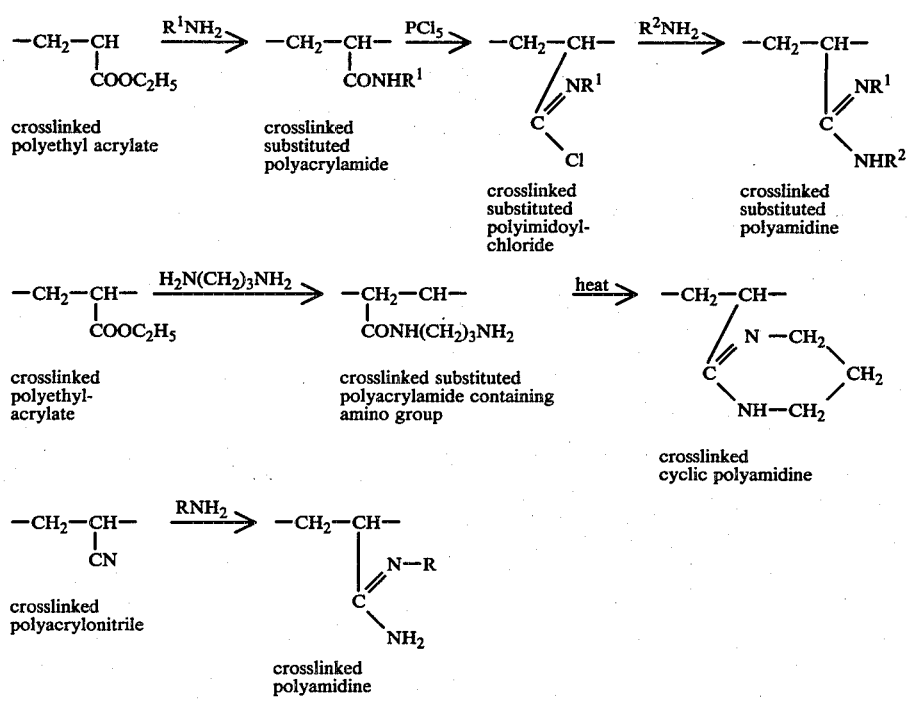

Instead of utilising the acrylates, the corresponding methacrylates can be used and the hydrogen substituent may be replaced by other groups Q.

The preferred method comprises reacting cross-linked polyacrylate with a primary amine to form the corresponding polyacrylamide, halogenating this to form the corresponding polyimidoyl chloride or other halide and reacting this with a primary or secondary amine or ammonia. The acrylate may be any alkyl (preferably $C_{1-6}$ alkyl) acrylic ester, the ethyl ester being preferred.

In the first of these reactions the first step, the reaction of the primary amine with cross-linked polymethyl or polyethyl acrylate, may be conducted at atmospheric or elevated pressure in the presence or absence of a high boiling solvent at a temperature above 80° C. Preferably the temperature is 100° to 200° C. and the reaction is conducted for less than 100 hours although sometimes the reaction may be at 100° to 150° C. for a time in excess of 100 hours, usually less than 250 hours. The reaction time is usually at least 10 hours. The pressure is preferably elevated, e.g. 1 to 10 atmospheres, and most preferably it is the autogenous pressure. Preferably the reaction is conducted at elevated pressure without solvent. When solvent is used, a suitable high boiling solvent is ethylene glycol, but any other solvent for the ingredients and reaction product and that boils at or above the reaction temperature and that will not interfere in the reaction may be used.

The cross-linked polymethyl or polyethyl acrylate is preferably a copolymer of divinyl benzene with methyl or ethyl acrylate. The amount of amine used must be at least the stoichiometric amount and is preferably greater than twice the stoichiometric amount, for instance four times. The amount of solvent is generally at least ten times the amount of crosslinked polyacrylate. All amounts are on a molar basis.

The second step, the halogenation of the cross-linked substituted polyacrylamide, is conducted in a solvent that is inert in the polyacrylamide and preferably that will swell the polymer without dissolving it, at temperatures of, for instance, 20° to 100° C., preferably 20° to 40° C. The solvent is preferably a nonpolar solvent. Toluene is suitable but 1,2-dichloroethane is preferred. The reaction time is generally greater than 1 hour but less than 100 hours, and preferably is less than 72 hours. Halogenating agents other than phosphorus pentachloride can be used such as phosphorus trichloride, thionylchloride or phosgene.

The third step of the reaction can be conducted merely by mixing the resin in dry form or swollen with a solvent that will swell it and will dissolve the other reactants, preferably dichloroethane or toluene with the appropriate amine, either anhydrous or aqueous primary or secondary amine, or anhydrous or aqueous ammonia when $R^2$ represents hydrogen. Preferably this third step is conducted using the solvent-swollen resin from the second step, without any intervening drying stage.

The resins may be used in the conventional manner, e.g. with upflow or downflow of the water to be treated through a bed of the resin in bead form, with the resin being regenerated when necessary. If the amidine groups are intended to be in free base form then regeneration can be with sodium hydroxide, whilst if the groups are intended to be in hydrochloride form (as is often preferred for nitrate removal) regeneration can be with sodium chloride.

The following are some Examples of the invention.

EXAMPLE 1

Polyethyl acrylate cross-linked with 1% divinylbenzene was mixed with n-butylamine and ethylene glycol in the molar ratio of 1:4:15 and the mixture was refluxed at 120° C. for 167 hours. Analysis of the product showed that it contained 9.59% N, 71.9% amide, 5.1% of unreacted ester and 21.6% imide as by-product. The product was purified by washing with industrial methylated spirit, it was dried at 90° C. and analysed. It was then mixed with phosphorous pentachloride dissolved in toluene in the molar ratio 1:2.3:21.6 and maintained at a temperature of 100° C. for 3 hours. At the end of this period a sample of the product was taken, washed with toluene and dried overnight at 95° C. (the high temperature drying appears necessary to decompose a chloride complex). The chlorine content was then measured and found to be 11.13%.

The resultant product was then washed with toluene and it was contacted with ethylamine in a molar ratio of 1:3 for 24 hours at room temperature. At the end of this time the resin was separated from the excess of amine by filtration, it was washed with fresh amine and ultimately with distilled water. It was converted to the hydrochloride form by slowly passing through it a 5% solution of hydrochloric acid. Ultimately, it was washed again with distilled water.

The free base product was shown by analysis to contain 13.27% N. The salt form of the product has a water regain of 0.83 g/g and a weight capacity of 2.02 meq/g.

In similar manner butylamine or ammonia may be used in place of the ethylamine.

EXAMPLE 2

Polyethyl acrylate crosslinked with 4% divinylbenzene was mixed with n-propylamine in the molecular ratio 1:4 and the mixture was heated in a pressure vessel for 24 hours at the temperature of 185° C. Analysis of the product showed that it contained 5% unreacted ester and 3% of imine derivative as by-product. The product was purified by washing with industrial methylated spirit and water until the washings were neutral. It was dried at 90° C.

The crosslinked poly(n-propylacrylamide) was swollen in an excess of 1,2-dichloroethane and mixed with a solution of phosphorous pentachloride in the same solvent. The molar ratio crosslinked polymer:-phosphorous pentachloride:dichloroethane was 1:1.5:10. The reaction mixture was kept at room temperature under stirring for 60 hours. The resultant product was washed with dichloroethane and used in the next reaction step without drying. A small sample of the product was dried at 90° C. and analysed for chlorine content which was found to be 21.5% which indicated an 80% conversion to imidoyl chloride intermediate.

The resultant product was contacted with an excess of 70% w/w solution of ethylamine in water and it was left for 48 hours at the temperature below 35° C. At the end of this time the resin was separated from the excess of amine by filtration then a 20% w/w solution of hydrochloric acid was added and it was left to stand for 4 hours. The product was finally washed in a column with N/1000 hydrochloric acid.

The free base product was shown by analysis to contain 17.2% nitrogen, the hydrochloride form had swelled in water to the extent of 1.23 g water per 1 g of dry resin. The total exchange capacity was 2.88 meq/1 g dry resin.

In similar way butylamine or ammonia may be used in place of the ethylamine.

The amidine ion exchange resins of these Examples may be contacted with water containing nitrate and other ions in conventional manner and will result in selective removal of nitrate. They can be regenerated using sodium hydroxide or sodium chloride. For instance in a typical example the value

for the resin of Example 1 was found to be between 7.3 and 10.7 compared to values of between 1.5 and 4.1 for a range of known weak and strong base resins. The values of $\bar{X}_{NO_3^-}$ were similar in both cases, between 0.70 and 0.56.

The results show that although the resins of the invention have a value

similar to that reported for the physically held liquid, water immiscible, amidine having two long chain alkyl groups on its nitrogen atoms providing a total of 20 carbon atoms as identified in Grinstead and Jones (supra) the resins of the invention have a much higher capacity. It is impossible to make an ion exchange resin containing amidine groups carrying substituents providing 20 carbon atoms and that will permit satisfactory absorption of nitrate, regeneration and contact between the exchange groups and water.

I claim:

1. A water-swellable, ion exchange resin comprising a cross-linked vinyl polymeric matrix and amidine groups chemically bonded to the matrix and which have the formula

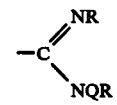

where Q represents hydrogen or $C_{1-4}$ alkyl and both of R represent $C_{1-6}$ alkyl or one R is $C_{1-6}$ alkyl and one R is benzyl, which in total provide up to 12 carbon atoms.

2. A resin according to claim 1 in which the matrix is a vinyl polymer cross-linked with divinyl benzene.

3. A resin according to claim 1 in which the radicals R are the same or different and represent $C_{1-6}$ alkyl and the radical Q represents hydrogen.

4. A resin according to claim 1 in which the radicals R are the same or different and represent methyl, ethyl, a propyl, or a butyl and Q is hydrogen.

5. A resin according to claim 1 in which one radical R is selected from methyl, ethyl, propyl and butyl, and one radical R is a butyl.

6. A resin according to claim 1 in which one radical R is ethyl and the other is butyl.

7. A resin according to claim 1 in which the total number of carbon atoms in the two groups R and Q is 4 to 9.

8. A resin according to claim 1 in which the total number of carbon atoms in the groups R and Q is 5 to 7.

9. A method of selectively removing nitrate ion from water comprising contacting the water with a water-swellable ion exchange resin comprising a cross-linked vinyl polymeric matrix and amidine groups chemically bonded to the matrix and which have the formula

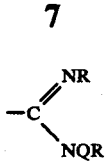

where Q represents hydrogen or $C_{1-4}$ alkyl and both of R represent $C_{1-6}$ alkyl or one R is $C_{1-6}$ alkyl and one R is benzyl, which in total provide up to 12 carbon atoms.

10. A method according to claim 9 in which the total number of carbon atoms in the groups R and Q is 4 to 9.

11. A method according to claim 9 in which the said number is 5 to 7.

12. A method according to claim 9 in which one radical R is ethyl and the other is butyl.

13. A method of making a resin according to claim 1 comprising reacting crosslinked polyacrylate with a primary amine to form the corresponding polyacrylamide, halogenating this to form the corresponding polyimidoyl halide and reacting this with a primary or secondary amine or ammonia.

14. A method according to claim 9 in which the radicals R are the same or different and represent $C_{1-6}$ alkyl and the radical Q represents hydrogen.

15. A method according to claim 9 in which the radicals R are the same or different and represent methyl, ethyl, a propyl, or a butyl and Q is hydrogen.

16. A method according to claim 9 in which one radical R is selected from methyl, ethyl, propyl and butyl, and one radical R is a butyl.

* * * * *